United States Patent
Yanagidaira et al.

(10) Patent No.: US 11,500,770 B2
(45) Date of Patent: Nov. 15, 2022

(54) MEMORY DEVICE CONTROLLING INCLUDING READING FROM A FIRST MEMORY AND WRITING TO A SECOND MEMORY BASED ON TIMING AND CONTROL SIGNALS

(71) Applicant: Kioxia Corporation, Minato-ku (JP)

(72) Inventors: Kosuke Yanagidaira, Fujisawa (JP); Shouichi Ozaki, Komae (JP)

(73) Assignee: Kioxia Corporation, Minato-ku (JP)

( * ) Notice: Subject to any disclaimer, the term of this patent is extended or adjusted under 35 U.S.C. 154(b) by 0 days.

(21) Appl. No.: 16/922,612

(22) Filed: Jul. 7, 2020

(65) Prior Publication Data
US 2020/0334146 A1    Oct. 22, 2020

Related U.S. Application Data

(63) Continuation of application No. 15/687,910, filed on Aug. 28, 2017, now Pat. No. 10,725,909, which is a
(Continued)

(51) Int. Cl.
*G06F 12/06*    (2006.01)
*G06F 13/16*    (2006.01)

(52) U.S. Cl.
CPC .......... *G06F 12/0653* (2013.01); *G06F 13/16* (2013.01); *G06F 2212/251* (2013.01); *Y02D 10/00* (2018.01)

(58) Field of Classification Search
None
See application file for complete search history.

(56) References Cited

U.S. PATENT DOCUMENTS

| 7,409,473 B2 | 8/2008 | Conley et al. |
| 8,930,647 B1 | 1/2015 | Smith |

(Continued)

FOREIGN PATENT DOCUMENTS

| JP | 2000-315185 | 11/2000 |
| JP | 2004-021713 | 1/2004 |

(Continued)

OTHER PUBLICATIONS

International Search Report dated May 19, 2015 in PCT/JP2015/056707 filed Mar. 6, 2015 (with English Translation).
(Continued)

*Primary Examiner* — Brian R Peugh
*Assistant Examiner* — Marwan Ayash
(74) *Attorney, Agent, or Firm* — Oblon, McClelland, Maier & Neustadt, L.L.P.

(57) ABSTRACT

According one embodiment, a memory device controlling method includes: receiving, by a first semiconductor memory, a read command transmitted from a controller; receiving, by a second semiconductor memory, a write command transmitted from the controller; reading, by the first semiconductor, data from the first semiconductor memory based on the read command, and transmitting, from the first semiconductor memory to the second semiconductor memory, the data and a control signal indicating that the data is output; and receiving, by the second semiconductor memory, the data at a timing based on the control signal transmitted from the first semiconductor memory without intermediation of the controller based on the write command and writing the received data into the second semiconductor memory.

9 Claims, 14 Drawing Sheets

Related U.S. Application Data continuation of application No. PCT/JP2015/056707, filed on Mar. 6, 2015.

(56) References Cited

U.S. PATENT DOCUMENTS

| | | |
|---|---|---|
| 2006/0136687 A1 | 6/2006 | Conley et al. |
| 2008/0285699 A1* | 11/2008 | Jang .................... G11C 7/1087 375/376 |
| 2011/0264851 A1 | 10/2011 | Jeon et al. |
| 2012/0260005 A1 | 10/2012 | Couvee |
| 2012/0278539 A1 | 11/2012 | Hosogaya |
| 2013/0060981 A1* | 3/2013 | Horn .................... G06F 3/0659 710/107 |
| 2015/0078109 A1 | 3/2015 | Kamibeppu |
| 2015/0143037 A1 | 5/2015 | Smith |
| 2015/0205729 A1* | 7/2015 | Bates ................. G06F 9/45558 710/26 |

FOREIGN PATENT DOCUMENTS

| | | |
|---|---|---|
| JP | 2007-310680 | 11/2007 |
| JP | 2008-524748 | 7/2008 |
| JP | 2008-192201 | 8/2008 |
| JP | 2012-230621 | 11/2012 |
| JP | 2015-056105 | 3/2015 |

OTHER PUBLICATIONS

Written Opinion dated May 19, 2015 in PCT/JP2015/056707 filed Mar. 6, 2015.

\* cited by examiner

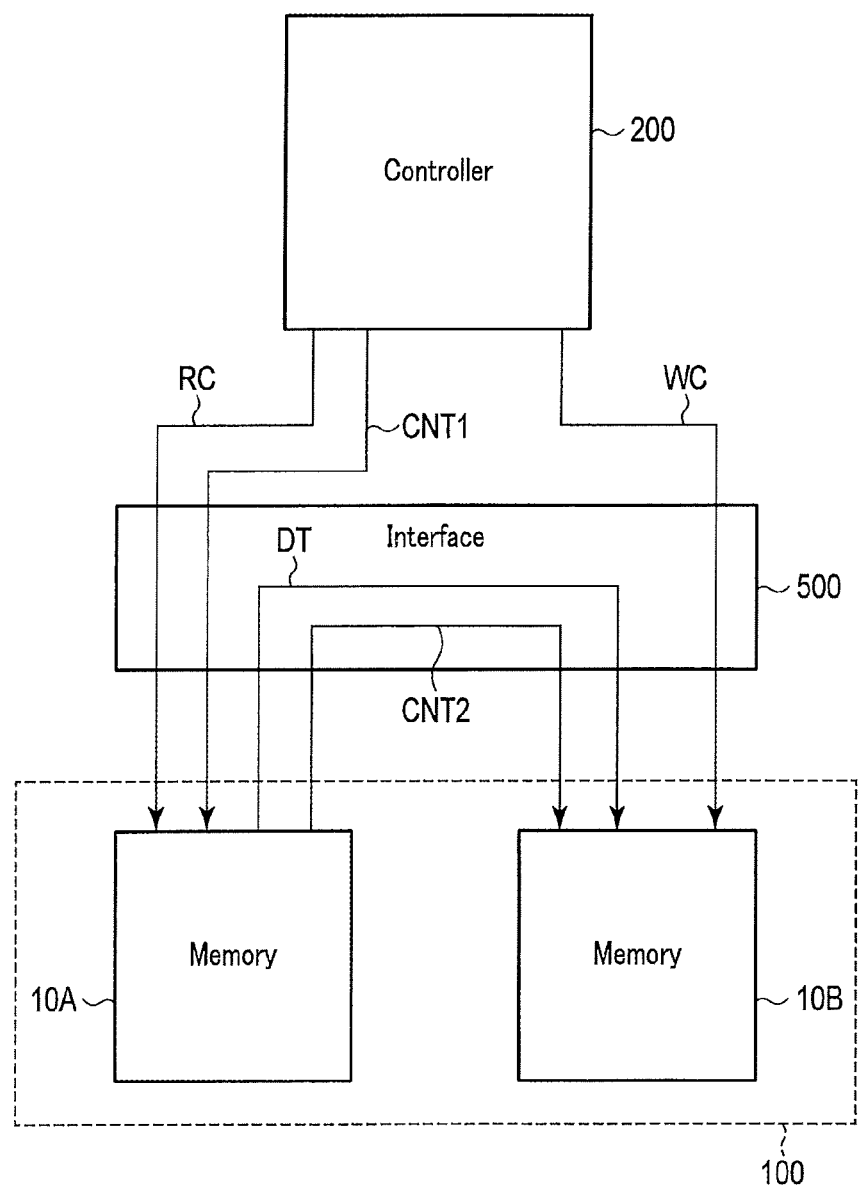
F I G. 2

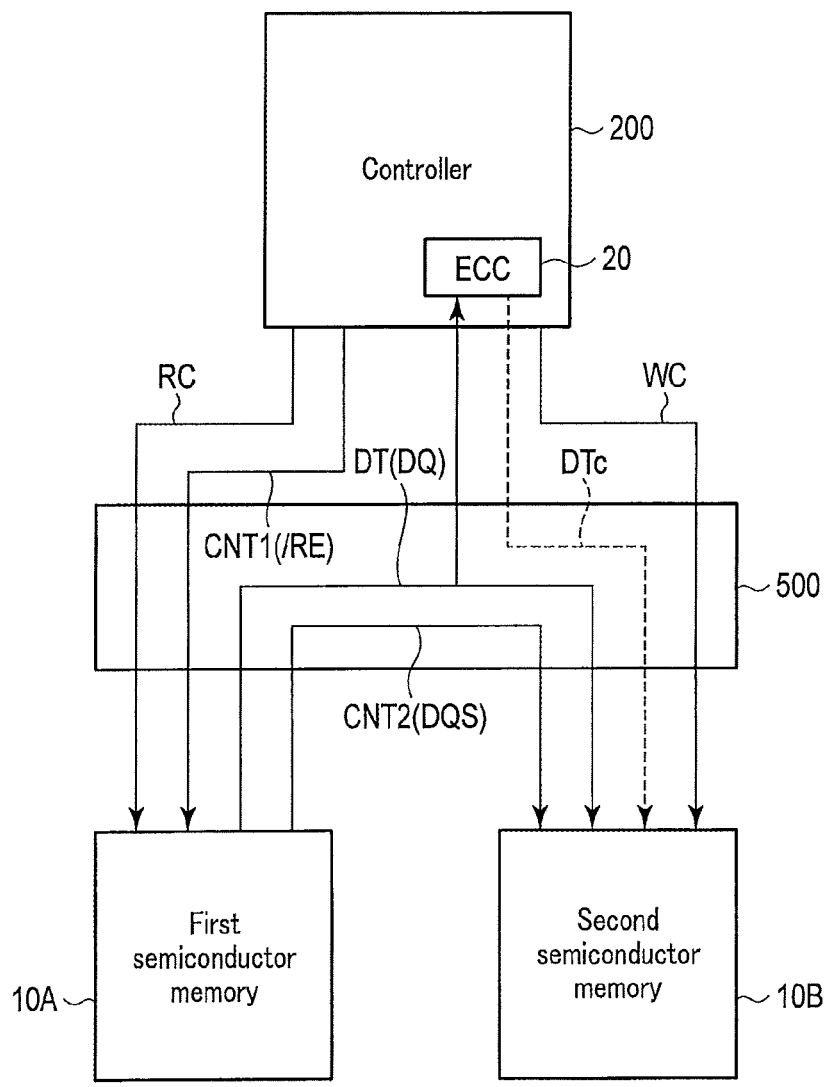
F I G. 12

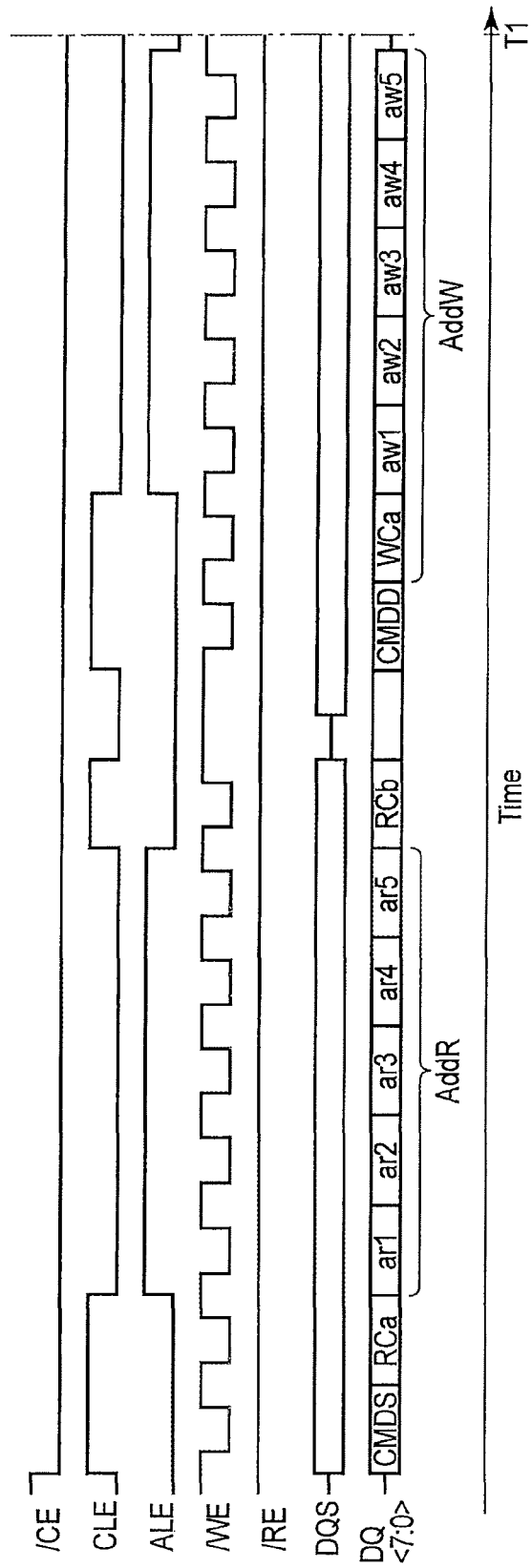
F I G. 15

MEMORY DEVICE CONTROLLING INCLUDING READING FROM A FIRST MEMORY AND WRITING TO A SECOND MEMORY BASED ON TIMING AND CONTROL SIGNALS

CROSS-REFERENCE TO RELATED APPLICATIONS

This application is a Continuation Application of U.S. application Ser. No. 15/687,910 filed Aug. 28, 2017, which is a Continuation Application of PCT Application No. PCT/JP2015/056707, filed Mar. 6, 2015, the entire contents of each of which are incorporated herein by reference.

FIELD

Embodiments described herein relate generally to a memory device controlling method and a memory device.

BACKGROUND

In recent years, there has been a rapid spread of mobile devices such as smart phones and tablet terminals. These mobile devices incorporate therein, for data storage, a semiconductor memory such as a flash memory that stores data in a non-volatile manner and a DRAM that temporarily stores data. A semiconductor memory is coupled to a controller by way of a memory interface.

In order to improve the operability of the device, a higher speed (higher frequency) of data transfer between the semiconductor memory and the controller is continuously being achieved. Accordingly, the amount of electric power consumed by the controller and the semiconductor memory is likely to increase.

To supply power to a mobile device, a battery is adopted. In order to keep a battery-driven device operating over a long period, a reduction in the power consumption in the device has been demanded.

BRIEF DESCRIPTION OF THE DRAWINGS

FIG. 2 is a diagram that explains a memory device controlling method according to the present embodiments.

FIG. 12 is a diagram that explains a memory device controlling method according to the fourth embodiment.

FIG. 15 is a diagram that explains an example of the operation of a memory device according to the sixth embodiment.

DETAILED DESCRIPTION

The present embodiments will be described in detail below, with reference to the drawings. In the following description, structural elements having the same functions and configurations will be denoted by the same reference symbols, and the same explanation will be given only where necessary.

In general, according to one embodiment, a memory device controlling method includes: receiving, by a first semiconductor memory, a read command transmitted from a controller; receiving, by a second semiconductor memory, a write command transmitted from the controller; reading, by the first semiconductor memory, data from the first semiconductor memory based on the read command, and transmitting, from the first semiconductor memory to the second semiconductor memory, the data and a control signal indicating that the data is output; and receiving, by the second semiconductor memory, the data at a timing based on the control signal transmitted from the first semiconductor memory without intermediation of the controller based on the write command and writing the received data into the second semiconductor memory.

Embodiments

The memory device and the memory device controlling method according to the present embodiments are explained by referring to FIGS. 1 to 15.

(1) Basic Examples

The basic examples of a memory device and its controlling method according to the embodiments will be explained with reference to FIGS. 1 and 2.

Figure 1:
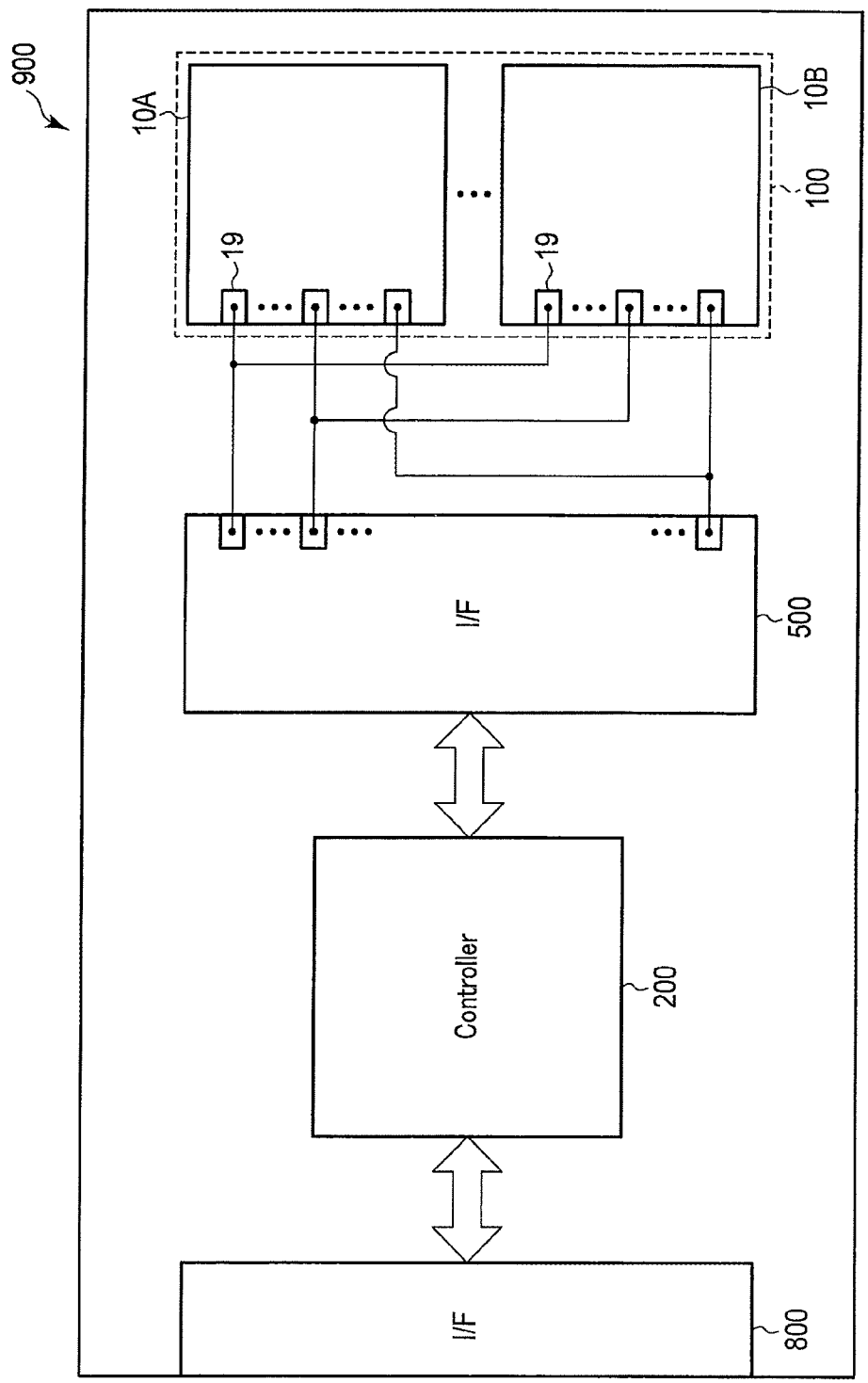
FIG. 1 is a diagram that explains an example of a structure of a memory device according to the present embodiments.

FIG. 1 is a schematic diagram that explains the basic structure of a memory device according to the embodiments.

As illustrated in FIG. 1, a memory device 100 according to the embodiments is provided inside a storage device 900, together with a controller 200. The storage device 900 is coupled to a host device (not shown) that is provided outside the storage device 900, by way of an interface (host interface) 800. The host device may be, for example, an MPU.

The memory device 100 is connected to the controller 200 by way of an interface (hereinafter referred to as a memory interface) 500.

The operation of the memory device 100 is controlled by the controller 200 by way of the memory interface 500.

The controller 200 outputs a command and control signals for controlling the operation of the memory device 10 to the memory device 100, based on a request from the host device.

The memory device 100 notifies the controller 200 of the operation status of the memory device 100 by way of the memory interface 500.

The memory device 100 includes at least two semiconductor memories 10A and 10B. The semiconductor memories 10A and 10B may be memories (memory chips) that are arranged in one package, or may be memories that are arranged in packages different from each other.

The two memories 10A and 10B, for example, are of the same type. The semiconductor memories 10A and 10B, for example, are non-volatile memories.

The semiconductor memories 10A and 10B include a plurality of pads as external connection terminals 19. The semiconductor memories 10A and 10B include pads for input/output of data, pads for input/output of various control signals, pads for receiving commands, and pads for receiving addresses. The external connection terminals 19 may be pins or bumps.

In the semiconductor memories 10A and 10B, each of the pads 19 having the same function (pads for input/output of the same signals), for example, are connected in common to the connection terminals of the memory interface 500. In such a structure, the plurality of semiconductor memories 10A and 10B are connected in parallel to each other with respect to the memory interface 500.

The memory device 100 according to the embodiments can achieve a direct data transfer between the two semiconductor memories 10A and 10B without the intermediation of the controller 200.

A basic example of the operation (controlling method) of the memory device 100 according to the present embodiments is explained with reference to FIG. 2.

FIG. 2 is a schematic conceptual diagram that explains the fundamental operation of the data transfer of the memory device 100 according to the present embodiments.

As illustrated in FIG. 2, the memory controller 200 transmits a command RC that indicates a data read request (hereinafter referred to as a read command), to the semiconductor memory 10A from which the data is to be read (hereinafter referred to as a copy source semiconductor memory).

The memory controller 200 transmits a command WC that indicates a data write request (hereinafter referred to as a write command), to a semiconductor memory 10B into which the data is to be written (hereinafter referred to as a copy destination semiconductor memory).

The memory device 100 according to the present embodiments receives a control signal CNT1 that controls the timing of the data transmission, from the memory controller 200. The copy source semiconductor memory 10A starts the data transmission based on the control signal CNT1.

In the memory device 100 according to the present embodiments, the copy source semiconductor memory 10A generates a control signal CNT2 to notify the output state of the data, based on the CNT1, and transmits the generated control signal CNT2 to the copy destination semiconductor memory 10B.

The copy destination semiconductor memory 10B controls the timing of receiving the data based on the control signal CNT2. The copy destination semiconductor memory 10B retrieves the data (hereinafter also referred to as copy data) DT from the copy source semiconductor memory 10A at the timing based on the control signal CNT2, and stores this data DT.

In this manner, the memory device 100 according to the present embodiments transfers the data DT directly from the semiconductor memory 10A to the semiconductor memory 10B, using the control signals CNT1 and CNT2 that relate to the transmission and reception (input and output) of the data at the copy source semiconductor memory 10A, without the intermediation of the memory controller 200.

As a result, the memory device 100 and the controlling method thereof according to the present embodiments can reduce the power consumption for data transfer.

(1) First Embodiment

A memory device and a memory device controlling method according to the first embodiment are explained with reference to FIGS. 3 to 9.

(a) Example Structure

A memory device according to the first embodiment is explained with reference to FIGS. 3 to 5.

Figure 3:
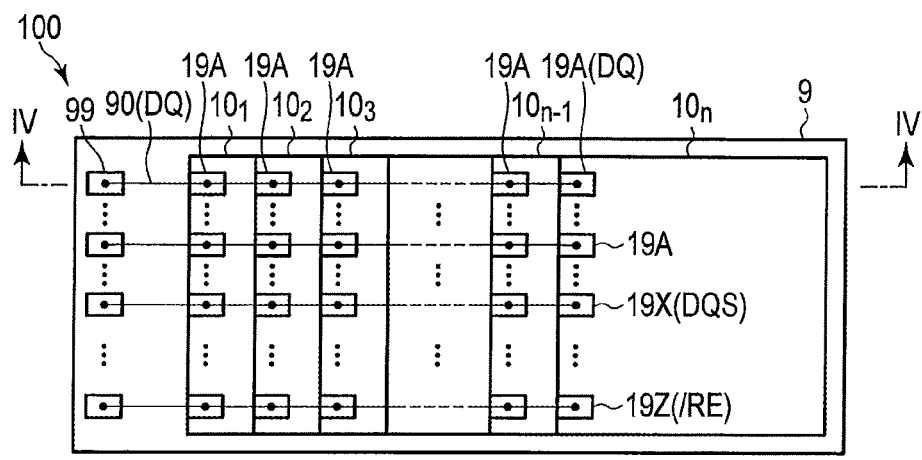
FIG. 3 is a diagram that explains an example of the structure of a memory device according to the first embodiment.

FIG. 3 is a schematic plan view that explains an example structure of the memory device according to the first embodiment. FIG. 4 is a schematic cross section view that explains the example structure of the memory device according to the first embodiment. FIG. 4 illustrates a cross-section structure along the line IV-IV in FIG. 3.

Figure 4:
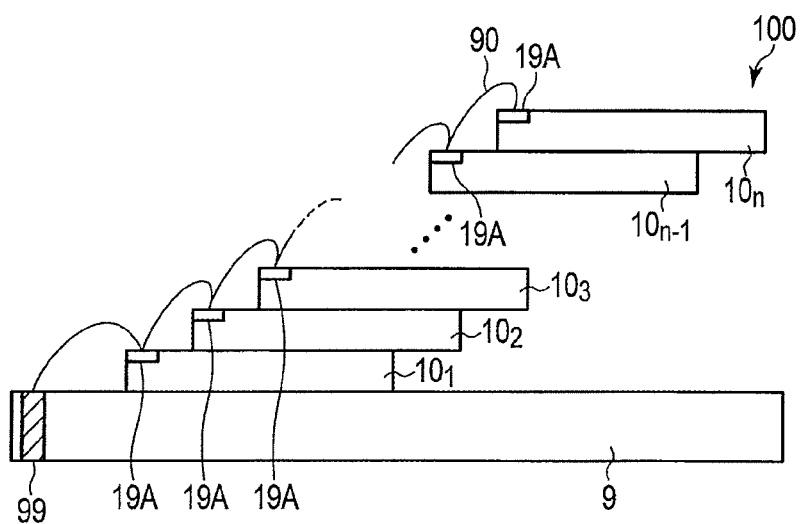
FIG. 4 is a diagram that explains the example of the structure of the memory device according to the first embodiment.

The memory device 100 in FIGS. 3 and 4 is provided in the storage device 900 of FIG. 1.

As shown in FIGS. 3 and 4, the memory device 100 includes a plurality of semiconductor memories (memory chips) $10_1$, $10_2$, $10_3$, $10_{n-1}$, and $10_n$ (n is an integer larger than or equal to 2). The memory device 100 can thereby realize a high storage density and large storage capacity. If the semiconductor memories $10_1$, $10_2$, $10_3$, $10_{n-1}$, and $10_n$ are not distinguished from each other, these semiconductor memories will be denoted as semiconductor memories 10.

A plurality of memory chips 10 is stacked on a substrate in order to reduce the size (area) of the package. The stacked memory chips 10 are connected to each other using bonding wires, through electrodes or the like.

As shown in FIGS. 3 and 4, for example, when the upper layer memory chip $10_n$ and the lower layer memory chip $10_{n-1}$ are connected by bonding wire, the upper layer memory chip $10_n$ is stacked on the lower layer memory chip $10_{n-1}$ and is displaced by a predetermined distance with respect to the lower layer memory chip $10_{n-1}$. As a result, the space for bonding the lower layer memory chip $10_{n-1}$ can be ensured, without pads 19A provided on the lower layer memory chip $10_{n-1}$ being covered by the upper layer memory chip $10_n$.

For example, the pads 19A of each memory chip 10 are connected to a common bonding wire 90. That is, the memory chips 10 share the wiring for input/output of each signal. For this reason, the memory chips 10 cannot simultaneously drive the data line. Thus, only one chip among a plurality of flash memories (and the controller) that share the data line is allowed to output data. The bonding wire (or through electrode) may be dealt with as part of the structural component of the memory interface.

More than one stacked assembly (multi-chip package) shown in FIGS. 3 and 4 may be included in the memory device 100.

The memory chip 10 may be a NAND flash memory.

Figure 5:
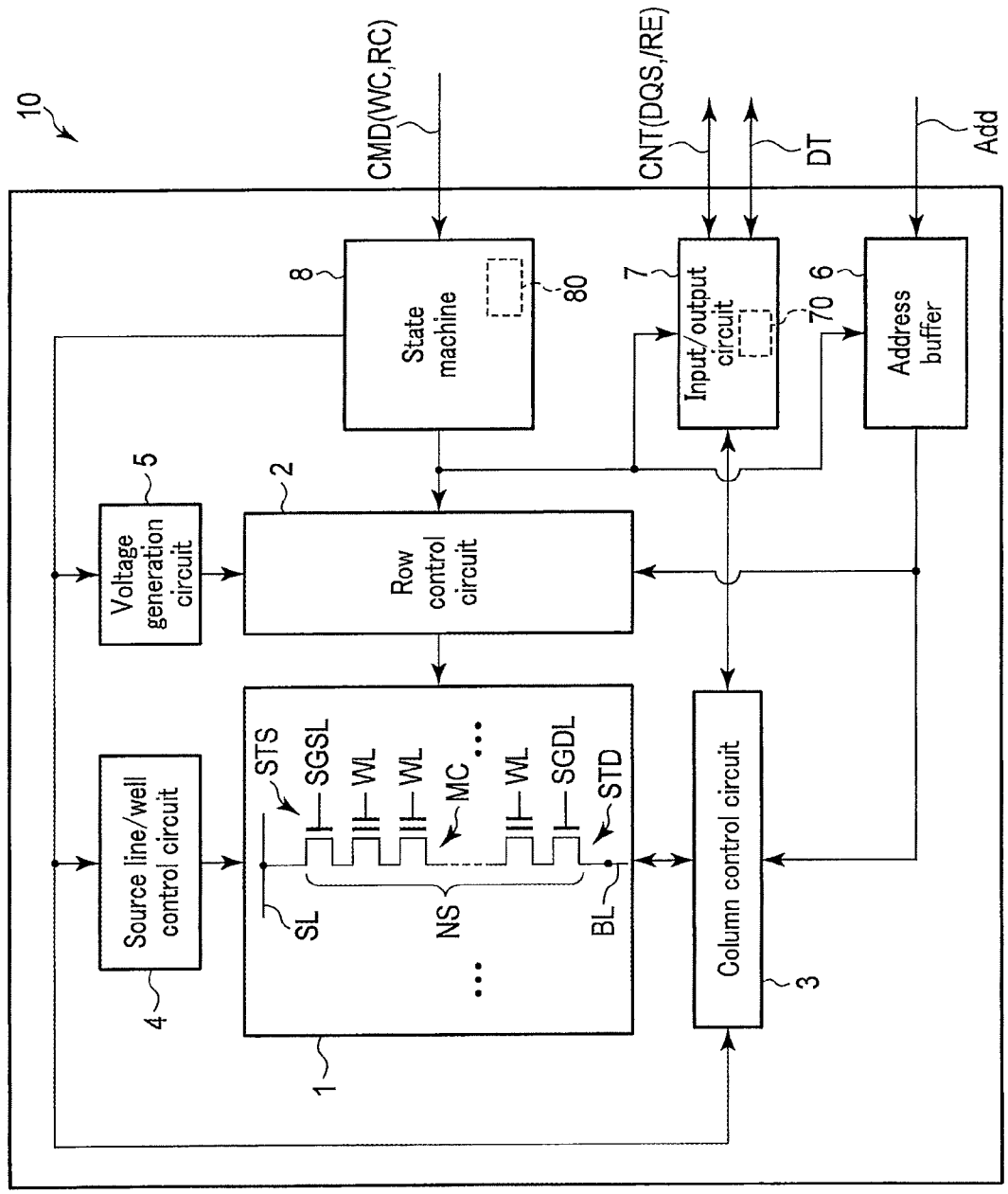
FIG. 5 is a diagram that explains an example of the structure of a memory device according to the first embodiment.

FIG. 5 is a block diagram showing the main portion of a NAND flash memory.

As illustrated in FIG. 5, the flash memory 10 includes a memory cell array 1.

In the NAND flash memory, the memory cell array 1 includes, for example, a plurality of memory units (NAND strings) NS. The plurality of memory units NS are aligned in the row direction.

Each memory unit NS includes a plurality of memory cells MC and two select gate transistors STD and STS.

In the each memory unit NS, the current paths of the memory cells MC are connected in series. The memory cell MC is a transistor including a charge-storage layer, for example. The charge-storage layer includes at least one of a floating electrode and a charge trapping film (e.g., SiN layer).

The current path of the drain-side select gate transistor STD is connected in series to one end (drain side) of the memory cells MC that are connected in series. The current path of the source-side select gate transistor STS is connected in series to the other end (source side) of the memory cells MC that are connected in series.

A plurality of word lines WL is provided in the memory cell array 1 to control the rows of the memory cell array 1. A word line WL is connected in common to the gates of the memory cells MC aligned in the row direction.

A plurality of bit lines BL is provided in the memory cell array 1. A bit line BL is connected to one end of the current path of the drain-side select gate transistor STD.

A source line SL is provided in the memory cell array 1. The source line SL is connected to one end of the current path of the source-side select gate transistor STS.

A drain-side and a source-side select gate line SGDL and SGSL are provided in the memory cell array 1. The drain-side select gate line SGDL is connected to the gates of the drain-side select gate transistors STD that are aligned in the row direction. The source-side select gate line SGSL is connected to the gates of the source-side select gate transistors STS that are aligned in the row direction.

In the NAND flash memory, a plurality of blocks (block addresses) are assigned in the memory cell array 1. A block is an erasable unit in a flash memory. The data write and read operations in the NAND flash memory are performed in units of pages. One or more pages (row addresses) are assigned to a word line WL.

The flash memory 10 includes a plurality of circuits (peripheral circuits) for controlling the operation of the memory cell array 1.

A row control circuit 2 can control the rows of the memory cell array 1. The row control circuit 2 is connected to the word line WL and the select gate lines SGDL and SGSL. The row control circuit 2 can select a word line WL based on the row address transferred from the address buffer 6 and control the operations (potentials) of the word line WL and the select gate lines SGDL and SGSL. The row control circuit 2 includes, for example, a row decoder and a driver.

The column control circuit 3 controls the columns of the memory cell array 1. The column control circuit 3 selects and activates a column (bit line) of a memory cell, using some units of control. At the time of data reading (the time of outputting the data from the memory cell array 1), the column control circuit 3 detects any change in the potential of the bit line BL (or generation of a current) and amplifies the signal that is based on the detected potential. In this manner, the data stored in the memory cell MC can be identified. The column control circuit 3 can control the potential of the bit line BL in accordance with the data that is to be written into the memory cell MC at the time of data writing (the time of inputting the data to the memory cell array 1). The column control circuit 3 temporarily stores the data that is read from the memory cell array 1 and the data that is to be written into the memory cell array 1. In order to realize these operations, the column control circuit 3 includes a column decoder, a sense amplifier circuit, a data latch circuit, and the like.

A source line/well control circuit 4 can control the potential of the source line SL and the potential of each well region in the memory cell array 1 and the blocks.

A voltage generation circuit 5 generates various voltages that are used at the time of data writing (programming), data reading, and erasing.

The address buffer 6 temporarily holds an address signal Add from the controller 200. The address signal Add from the controller 200 indicates a physical address, which includes a physical row address and a physical column address.

The input/output circuit 7 serves as an interface for inputting and outputting data inside the memory chip. The input/output circuit 7 can input and output various control signals CNT used for the flash memory 10. The input/output circuit 7 temporarily holds the data DT from the controller 200, and outputs the data DT to the memory cell array 1 via the column control circuit 3 at the timing based on the control signal CNT. The input/output circuit 7 temporarily holds the data output from the memory cell array 1, and outputs the data DT to the memory controller 200 at the timing based on the control signal CNT.

The state machine (interior control circuit) 8 manages the operation inside the flash memory 10. The state machine 8 receives and analyzes the command CMD from the controller 200. The command CMD may be supplied to the state machine 8 via the input/output circuit 7. Based on the result of the analysis (decoding) of the command CMD and also on the control signal CNT, the state machine 8 can control the operation of each circuit of the flash memory. The state machine 8 transmits to the memory controller 200 the control signal CNT that indicates the operation state (status) inside the flash memory 10. The operation state of the flash memory 10 is thereby notified to the memory controller 200 or other memory chips.

The NAND flash memory 10 used for the memory device 100 according to the present embodiment may include circuits 70 and 80 that perform a direct data transfer between the memories. Such circuits 70 and 80 will be discussed later.

The operation of the NAND flash memory 10 is controlled by control signals compliant with certain memory standards (e.g., JEDEC standard), such as a chip enable signal /CE, command latch enable signal CLE, address latch enable signal ALE, write enable signal /WE, read enable signal /RE, data strobe signal DQS and the like.

Based on these control signals and commands, the data signal (data DT) is transferred between the semiconductor memories 10A and 10B by way of the data line (hereinafter may be denoted as DQ line) 90. The data signal that is output onto the DQ line may be denoted hereinafter as a data signal DQ, for the sake of simplicity.

For example, a data signal DQ<7:0> of 1 byte (8 bits) is output to eight data lines 90, 1 bit on each data line. The data signal DQ<7:0> is retrieved the semiconductor memory 10 or controller 200 at the timing based on the data strobe signal DQS.

For various signals, the pads 19A, 19X, and 19Z, are assigned such that signals DQ, DQS, and/RE are supplied thereto. The layout of the pads illustrated in FIGS. 3 and 4 is merely a schematic illustration for the sake of explanation of the embodiment, and thus can be suitably modified in accordance with the specifications and standards of a semiconductor memory.

At the time of the data transfer (data copy) between the memories 10A and 10B in the memory device 100, one of the flash memories (memory chips) 10 included in the memory device 100 is selected and driven as a copy source memory (memory from which data is read) 10A, and another one of the flash memories is selected and driven as a copy destination memory (memory into which the data is written) 10B.

In the memory device according to the first embodiment, the data transfer between the flash memories is performed based on the SDR (Single Data Rate) standards. The data setup time tDS and data hold time tDH for data reception are ensured based on the SDR standards, and the copy data from the copy source flash memory 10A is thereby received by the copy destination flash memory 10B.

In the memory device 100 according to the present embodiment, copying of the data from the flash memory 10A to the flash memory 10B is controlled using the read enable signal /RE and data strobe signal DQS, in addition to the read commands RCa and RCb and write commands WCa and WCb.

The read enable signal /RE is a control signal that enables the data of the copy source flash memory 10A to be output onto the data line.

With the read enable signal /RE, the timing of the data reading from the copy source flash memory 10A is controlled. With the read enable signal /RE, the timing of generating the data strobe signal DQS at the copy source flash memory 10A and timing of outputting the data signal DQ are controlled.

The data strobe signal DQS is a signal indicating the output state of the data in the copy source flash memory 10A, and it also controls the timing of retrieving the data into the copy destination flash memory 10B.

The copy source flash memory 10A generates the data strobe signal DQS inside the flash memory 10A, based on the read enable signal /RE.

In the SDR-standard flash memory, the phase (edge) of the data signal DQ is aligned with the phase (edge) of the data strobe signal DQS. In the SDR-standard flash memory 10, signals DQ and DQS are output with the data signal DQ and the data strobe signal DQS being edge-aligned.

By the data strobe signal DQS, the timing of retrieving the data into the copy destination flash memory 10B is controlled.

The copy destination flash memory 10B writes the retrieved data into the memory region of the flash memory 10B. The copying operation of the data directly transferred between the flash memories 10A and 10B is thereby completed.

As a present embodiment, with the control of the data strobe signal DQS by the copy source flash memory 10A, the copy destination flash memory 10B can control retrieval of the data signal output from the copy source flash memory 10A based on this data strobe signal DQS.

In this manner, the memory device 100 according to the present embodiment can transfer the data directly between the semiconductor memories 10 without the intermediation of the memory controller 200.

(b) Operation Example

An operation example (controlling method) of the memory device according to the first embodiment will be explained by referring to FIGS. 6 to 8. FIGS. 1 to 5 will also be referred to, when necessary, to explain the memory device controlling method according to the present embodiment.

Figure 6:
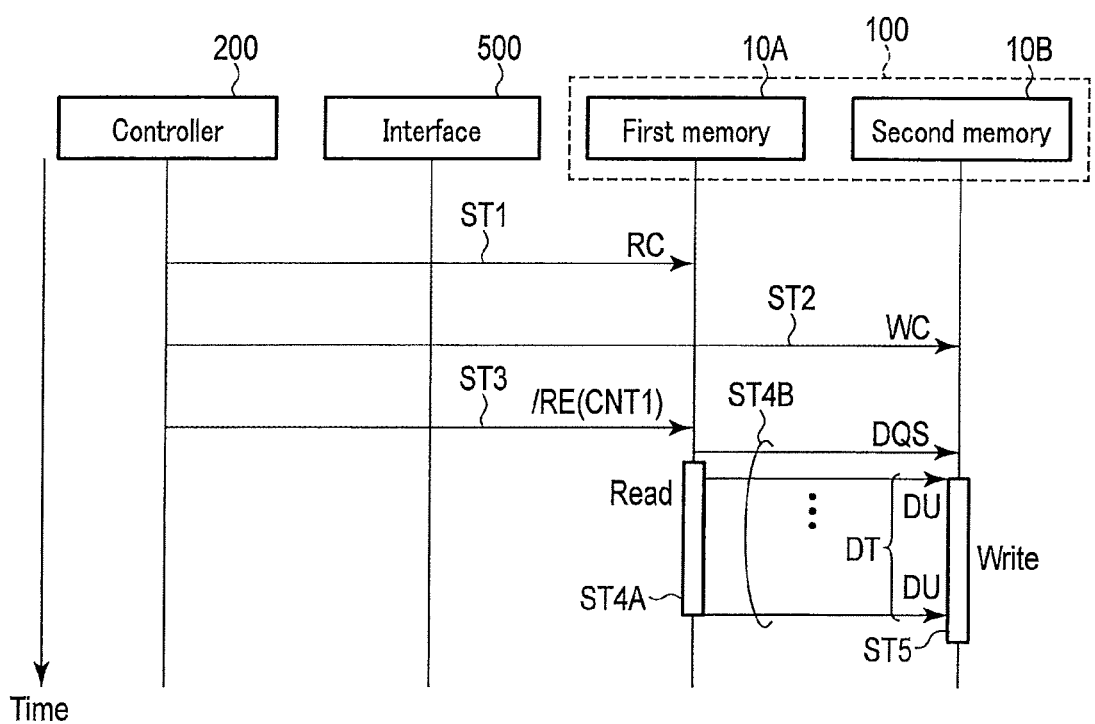
FIG. 6 is a diagram that explains an example of the operation of the memory device according to the first embodiment.

FIG. 6 is a schematic diagram that explains an example operation of the memory device according to the present embodiment. FIGS. 7 and 8 are timing charts of the signals, which explain the example operation of the memory device according to the embodiment.

Figure 7:
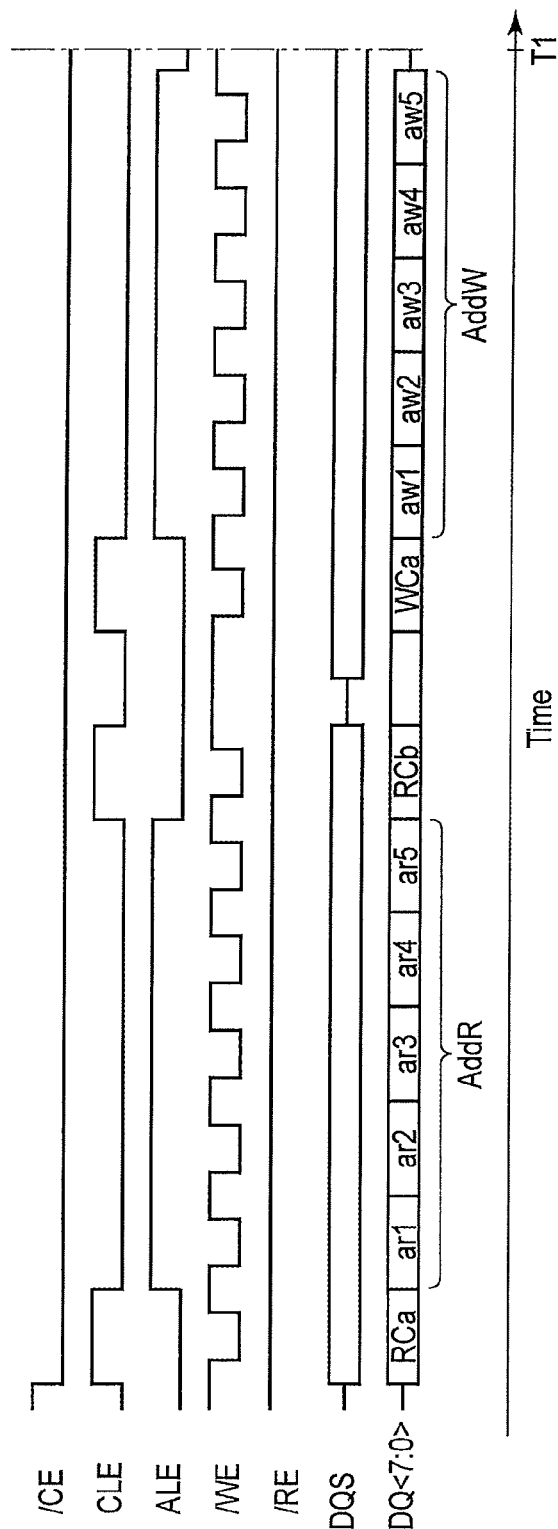
FIG. 7 is a diagram that explains an example of the operation of the memory device according to the first embodiment.

As illustrated in FIGS. 6 and 7, when the data transfer (data copying) between the semiconductor memories 10 of the memory device 100 is requested and performed, the memory controller 200 changes the chip enable signal /CE from the H (high) level to the L (low) level, thereby enabling (activating) the memory device 100 and its internal flash memories 10.

The memory controller 200 sets the command latch enable signal CLE to the H level. With the command latch enable signal CLE being at the H level, each of the flash memories 10 is turned to a state of being allowed to retrieve the command CMD from the memory controller 200.

The memory controller 200 transmits the read command RCa to the memory device 100 via the memory interface 500 and the data line 90 (Step ST1). Each of the flash memories 10 of the memory device 100 retrieves the read command RCa while the H-level command latch enable signal CLE is at the H level.

The memory controller 200 changes the setting of the address latch enable signal ALE from the L level to the H level in synchronization with the timing of changing the command latch enable signal CLE from the H level to the L level. With the address latch enable signal ALE being at the H level, each of the flash memories 10 is turned to the state of being allowed to retrieve an address from the memory controller 200.

The memory controller 200 transmits, subsequently to the read command RCa, the address AddR of the copy source NAND flash memory (hereinafter, referred to as a read address) to the memory device 100 via the memory interface 500 and data line 90. Each of the flash memories 10 in the memory device 100 retrieves the read address AddR while the address latch enable signal ALE is at the H level. The read address AddR includes a plurality of addresses ar1, ar2, ar3, ar4, and ar5 corresponding to each of control units, such as page addresses and block addresses.

The plurality of flash memories 10 in the memory device 100 each receive the read command RC and read address AddR. A copy source flash memory 10A is selected based on the chip address ar5 included in the read address AddR. The copy source flash memory 10A retrieves a command RCb which is paired with the read command RCa, and prepares for data reading. Based on the chip address ar5, the flash memories other than the copy source memory 10A are turned into a non-selected state (for example, a suspended state).

In the following description, when the leading read command RCa and the end read command RCb are not distinguished from each other, these read commands RCa and RCb will be denoted as read commands RC.

After the memory device 100 receives the read commands RC and read address AddR, the memory controller 200 individually controls the command latch enable signal CLE and address latch enable signal ALE in the same manner as the transmission of the read commands RC and read address AddR, and sequentially transmits the write commands WCa and WCb and the address of the copy destination NAND flash memory (hereinafter referred to as a write address)

AddW, to the memory device 100 via the memory interface 500 (Step ST2). The write address AddW includes, in the same manner as the read address AddR, a plurality of addresses aw1, aw1, aw3, aw4, and aw5 which correspond to each of control units, such as page addresses and block addresses.

In accordance with the control signals CLE and ALE, each of the plurality of flash memories 10 other than the chip 10A, which has been selected as the copy source first flash memory, retrieves the write command WCa and write address AddW. The second flash memory 10B that is the copy destination is selected based on the chip address aw5 included in the write address AddW. The copy destination second flash memory 10B prepares for data writing. Based on the chip address ar5, the flash memories other than the copy source and copy destination memories 10A and 10B are turned into the non-selected state (for example, suspended state).

As a result, under the control of the memory controller 200, the copy source and copy destination flash memories 10A and 10B are selected in a time period from the start of a request for the inter-memory data transfer (copying operation) to time T1.

During the transmission and reception of the commands RC and WC and addresses AddR and AddW, the write enable signal /WE is output at a certain clock frequency for the reception of the commands and addresses. Here, the read enable signal /RE is held at the H level.

Figure 8:
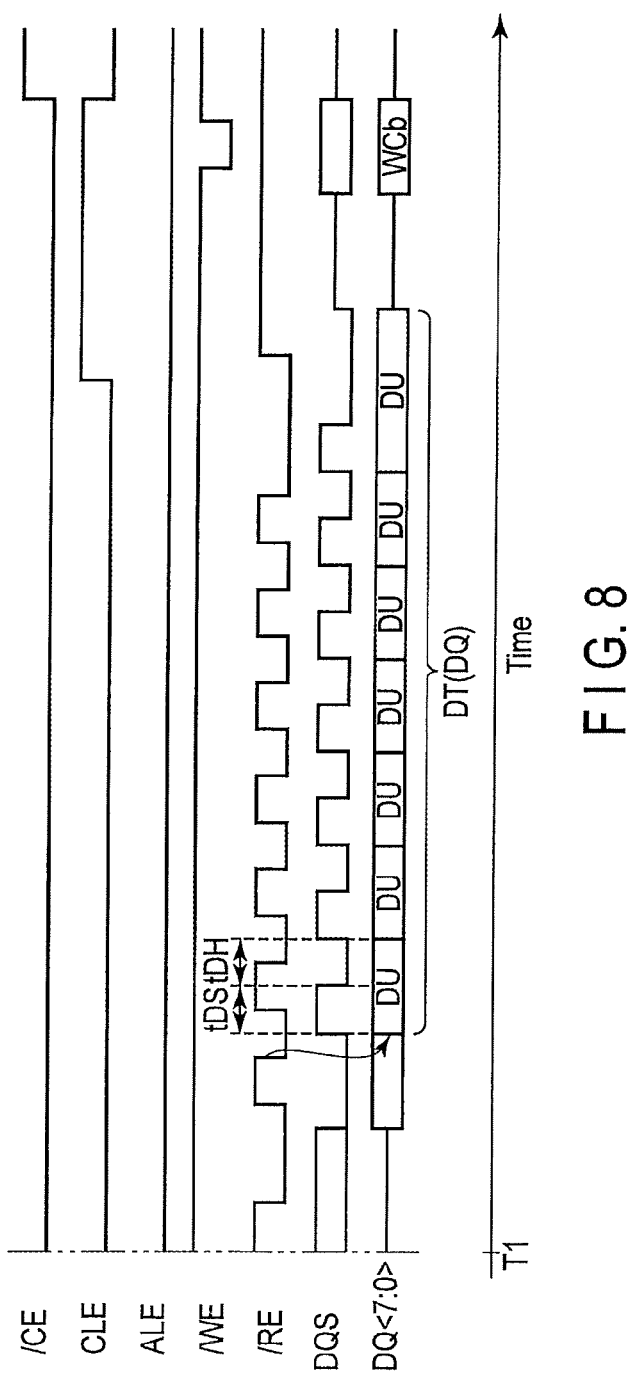
FIG. 8 is a diagram that explains an example of the operation of the memory device according to the first embodiment.

As illustrated in FIG. 8, the memory controller 200 drives the read enable signal /RE at time T1, which is after the selection of the copy source and copy destination flash memories 10A and 10B is made, and transmits the read enable signal /RE of a certain clock frequency based on the operating speed of the memory device. During the period of the read enable signal /RE of the certain clock frequency being output, the write enable signal /WE may be held, for example, at the H level.

The copy source flash memory 10A receives the read enable signal /RE of the certain clock frequency from the memory controller 200.

The copy source flash memory 10A reads the data DT from the memory region indicated by the address AddR (Step ST4A). Furthermore, the copy source flash memory 10A outputs the data strobe signal DQS and the read data DT (Step ST4B).

The flash memory 10A drives the interconnect (data strobe line) to which the data strobe signal DQS is output, based on the read enable signal /RE.

The flash memory 10A generates a data strobe signal DQS of a certain clock frequency, and outputs the generated data strobe signal DQS onto the data strobe line (and the memory interface 500). The clock frequency of the generated data strobe signal DQS is the same as the clock frequency of the read enable signal /RE from the memory controller 200.

The flash memory 10A outputs the data signal DQ (data DT) together with the data strobe signal DQS onto the data line 90 (and the memory interface 500), based on the read enable signal /RE. The data signal DQ includes, for example, one or more data units (for example, 8 bits of data) DU.

In the flash memory 10A having an SDR-standard interface, the phase of the data signal DQ is aligned to the phase of the data strobe signal DQS. The output timing of the data signal DQ is synchronous with the rising edge of the data strobe signal DQS.

In the data transfer of flash memory based on the SDR-standard, the clock frequency of the data strobe signal DQS is, for example, twice the switching frequency of the data signal. The switching frequency of the data signal may be determined based on the output period of each data unit. For example, one cycle of switching frequency corresponds approximately to the output period for two data units DU.

The copy destination flash memory 10B receives the data strobe signal DQS. Upon receipt of the data strobe signal DQS, the flash memory 10B retrieves the data on the data line 90.

When viewed from the copy destination semiconductor memory 10B on the data reception side, the sufficient data setup time tDS and data hold time tDH is ensured, with respect to the rising edge of the data strobe signal DQS.

As a result, the copy destination second flash memory 10B can receive the data signal DQ directly from the copy source flash memory 10A, without the intermediation of the memory controller 200.

The flash memory 10B writes the retrieved data signal DQ into the memory region indicated by the write address AddW (Step ST5). The copying operation of the data is thereby performed through Steps ST4A, ST4B, and ST5.

The flash memory 10B retrieves the command WCb that is paired with the leading write command WCa at the timing of completing the data write operation. In the following description, when the leading write command WCa and the end write command WCb do not need to be distinguished from each other, these write commands WCa and WCb may be denoted as write commands WC.

For example, the second flash memory 10B notifies the memory controller 200 of the completion of the data write operation.

As discussed above, with the memory device controlling method according to the present embodiment, the data of the flash memory 10A is copied to the flash memory 10B, without the date transfer via the memory controller 200.

(c) Effects

When a NAND flash memory used for a memory device outputs (reads) a data signal, the data output of the flash memory is executed with the edges of the data signal and the data strobe signal being aligned, based on the data output control signal /RE that is output from the controller.

On the other hand, in order for the NAND flash memory to receive a data signal, sufficient data setup time tDS and data hold time tDH need to be ensured with respect to the edge of the data strobe signal DQS. In order to ensure sufficient data setup time tDS and data hold time tDH, the phase of the data signal and the data strobe signal may be shifted with respect to each other, in accordance with the standard of the data transfer for the flash memory.

For example, a toggle Double Data Rate (DDR) standard flash memory is determined as having the phase of the data signal and the phase (edge) of the data strobe signal shifted by 90 degrees when receiving the data. As discussed above, however, if the phases of the output data signal and data strobe signal are aligned at the time of outputting the data from the flash memory, it is difficult for the flash memory on the data reception side to have the ensured data setup time and data hold time in the DDR standard flash memory.

For this reason, if the phases of the data signal and the data strobe signal are shifted, the data output from a semiconductor memory cannot be transferred directly to another memory without the intermediation of the memory controller.

If this occurs, the data transfer (data copy) between the semiconductor memories may be performed the step of transferring data from the copy source semiconductor memory to the memory controller and the step of transferring the data from the memory controller to the copy destination semiconductor memory chip.

In such a data transfer between the semiconductor memories by way of a memory controller, there is a possibility that the efficiency in data transfer of the memory device and storage device may be lowered, and the power consumption of the device may be increased.

The memory device according to the present embodiment can transfer the data directly from the copy source first semiconductor memory 10A to the copy destination second semiconductor memory 10B without the intermediation of the memory controller 200. In other words, the data transfer between two semiconductor memories can be completed in a single step.

The memory device 100 according to the present embodiment can reduce the data transfer performed between the semiconductor memory 10A and 10B and the memory controller 200, as a result of which the power consumption in data transfer can be cut by half of the power consumption of a conventional memory device. Furthermore, as a result of the direct data transfer between the memories, the memory device 100 according to the present embodiment can reduce the time of data transfer.

Moreover, variations in the characteristics of semiconductor memories may occurs due to variations in the characteristics of chips depending on the manufacturing process, a difference in interconnect lengths connecting the semiconductor memory and the interface in accordance with the positional relationship between the semiconductor memory and the interface (controller) or the like.

For instance, the output response time tREA of the NAND flash memory varies in a range of 5 to 20 nanoseconds. On the other hand, switching of data signals in a flash memory can be performed in several nanoseconds.

When the data output from the copy source semiconductor memory is retrieved by the copy destination semiconductor memory without any control signal that indicates the data input/out timing, the copy destination semiconductor memory cannot detect the timing of data output from the copy source semiconductor memory if there are variations in the output response time tREA.

For this reason, when the data is directly transferred between two semiconductor memories without transmitting or receiving a control signal relating to the timing of data input/output, the timing of retrieving the output data cannot be switched in a cycle shorter than the variations of the output response time tREA.

If no control signal relating to the timing of the data input/output is used for the data transfer, the data transfer speed at the memory device cannot be enhanced.

In the memory device according to the present embodiment, the copy destination and copy source memories 10A and 10B are notified of the output timing of the data and the output state of the data by the read enable signal /RE and data strobe signal DQS.

Figure 9:
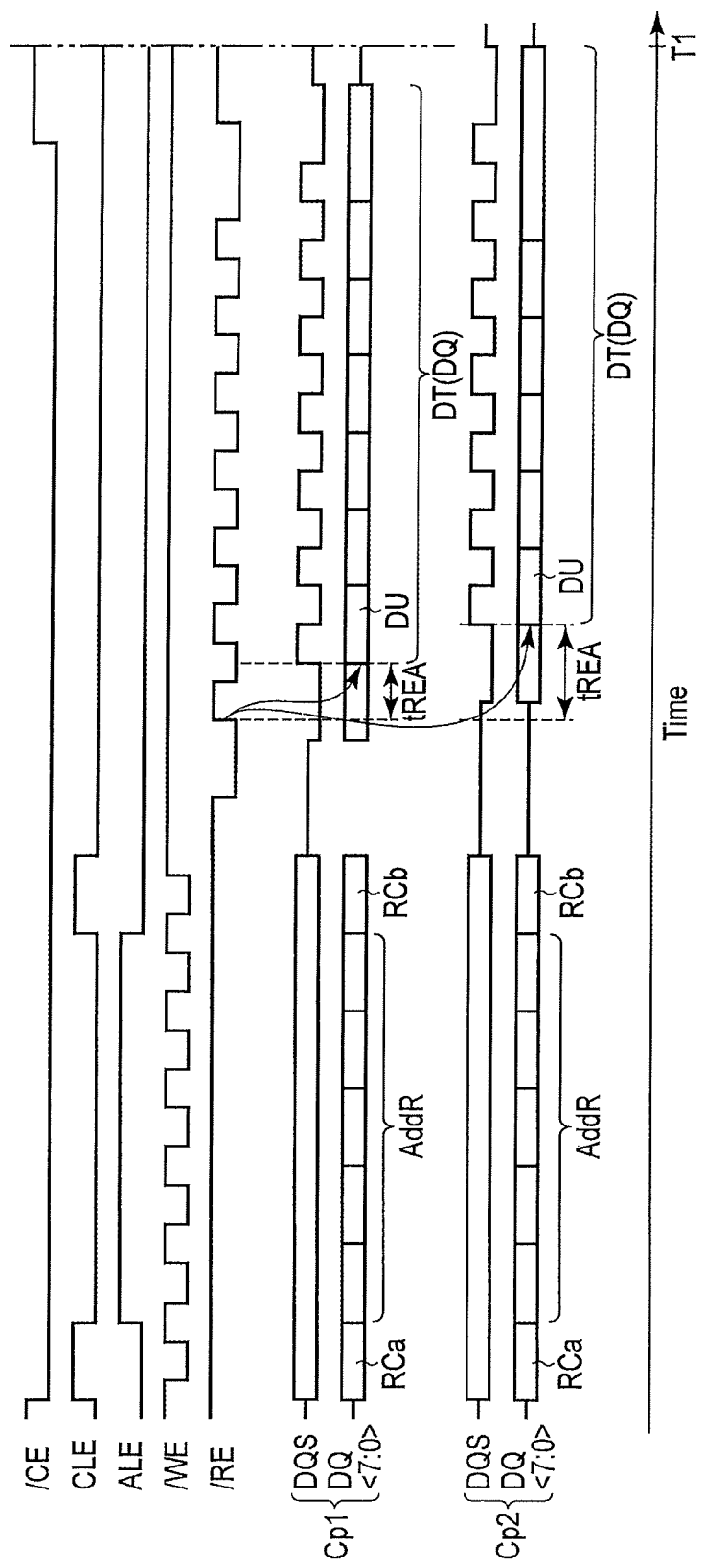
FIG. 9 is a diagram that explains an example of the operation of the memory device according to the first embodiment.

Thus, as the timing chart of each signal of a memory device shown in FIG. 9, even if a plurality of semiconductor memories in the memory device include a quick data outputting memory chip Cp1 (with a short output response time tREA) and a slow data outputting memory chip Cp2 (with a long output response time tREA), the copy destination semiconductor memory 10B can detect the timing of outputting the data from the copy source semiconductor memory 10A based on the control signals IRE and DQS that are supplied to each of the memories.

The memory device 100 according to the present embodiment uses control signals /RE and DQS that indicate the state of data output to control the direct data transfer between the semiconductor memories. As a result, a high-speed data transfer can be realized, regardless of the variations in the output response time tREA among the memories.

As discussed above, the memory device and the memory device controlling method according to the present embodiment can reduce the power consumption in the memory device.

(3) Second Embodiment

A memory device and a memory device controlling method according to the second embodiment are explained with reference to FIG. 10.

In the memory device 100 that performs a data transfer in accordance with the DDR standards, the data setup time tDS and data hold time tDH may each be ensured through phase shifting between the data signal DQ and the data strobe signal DQS.

According to the present embodiment, the NAND flash memory 10 in FIG. 5 includes a phase conversion circuit 70. The phase conversion circuit 70 may be provided, for example, in the input/output circuit 7. The phase conversion circuit 70 can conduct phase shifting between the data signal DQ and the data strobe signal DQS.

Figure 10:
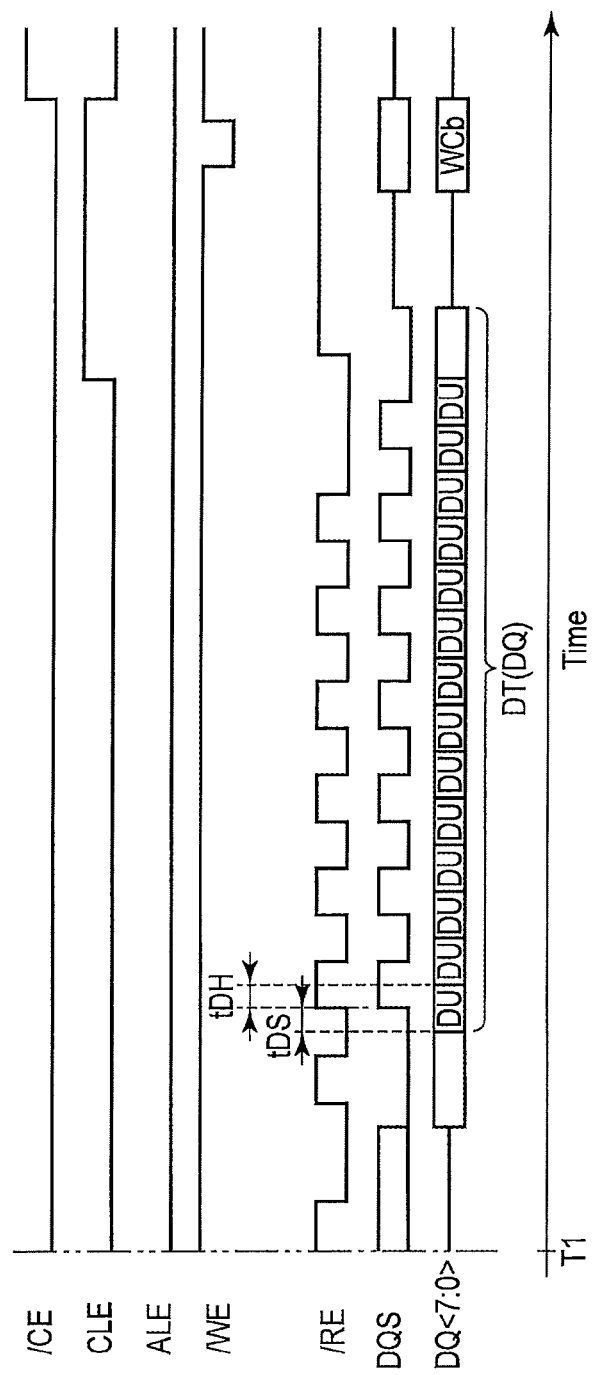
FIG. 10 is a diagram that explains an example of the operation of a memory device according to the second embodiment.

FIG. 10 is a timing chart showing the waveforms of each of control signals during a data transfer in the memory device according to the present embodiment.

In the same manner as the above-discussed embodiment, the memory controller 200 transmits a read enable signal /RE to a DDR-standard memory device 100 after the transmission of a read command RC and read address AddR and also after the transmission of the write command WC and write address AddW, as illustrated in FIG. 7.

As indicated in FIG. 10, the copy source first flash memory 10A generates a data strobe signal DQS. The first flash memory 10A in the DDR-standard memory device 100 generates, based on the read enable signal /RE received from the memory controller 200, the data strobe signal DQS having the same clock frequency as that of the read enable signal /RE.

The copy source first semiconductor memory 10A outputs the data strobe signal DQS whose phase has been shifted by the phase conversion circuit 70 with respect to the phase of the data signal DQ, to the outside of the memory 10A. The first flash memory 10A outputs the data signal DQ, together with the data strobe signal DQS.

For example, the frequency of the generated data strobe signal DQS may be approximately the same as the switching frequency of the data signal DQ.

If the phase of the data strobe signal DQS and the phase of the data signal DQ are shifted ideally by 90 degrees when the each of signals DQ and DQS are viewed from the copy destination second flash memory 10B, the memory device that performs the data transfer directly between the memories can ensure sufficient data setup time tDS and data hold time tDH for the data transmission and reception, with respect to both the rising edge and falling edge of the data strobe signal DQS.

Even when, as in a memory device according to the present embodiment, the data transfer is to be performed in accordance with the DDR standards by shifting the phases of the data signal DQ and the data strobe signal DQS by the phase conversion circuit 70, the data DT can be transferred directly from the copy source flash memory 10A to the copy destination flash memory 10B without the intermediation of the controller 200.

In light of the above, the memory device and its controlling method according to the second embodiment therefore can reduce the power consumption of the memory device in a manner so that the time for the DDR-based data transmission and reception can be ensured.

(4) Third Embodiment

A memory device and a memory device controlling method according to the third embodiment are explained with reference to FIG. 11.

In the memory device according to the second embodiment, the copy source flash memory (first semiconductor memory) 10A shifts the phases of the data signal and the data strobe signal relative to each other when transmitting the data.

In contrast, the memory device 100 according to the third embodiment shifts the phases of the data signal DQ and the data strobe signal DQS by the copy destination second flash memory (second semiconductor memory) 10B.

For example, the phases of the data signal DQ and the data strobe signal DQS are shifted by the phase conversion circuit 70 in the second flash memory 10B. The data signal DQ is retrieved into the second semiconductor memory 10B with the phases of the data signal DQ and the data strobe signal DQS being shifted inside the flash memory 10B.

Figure 11:
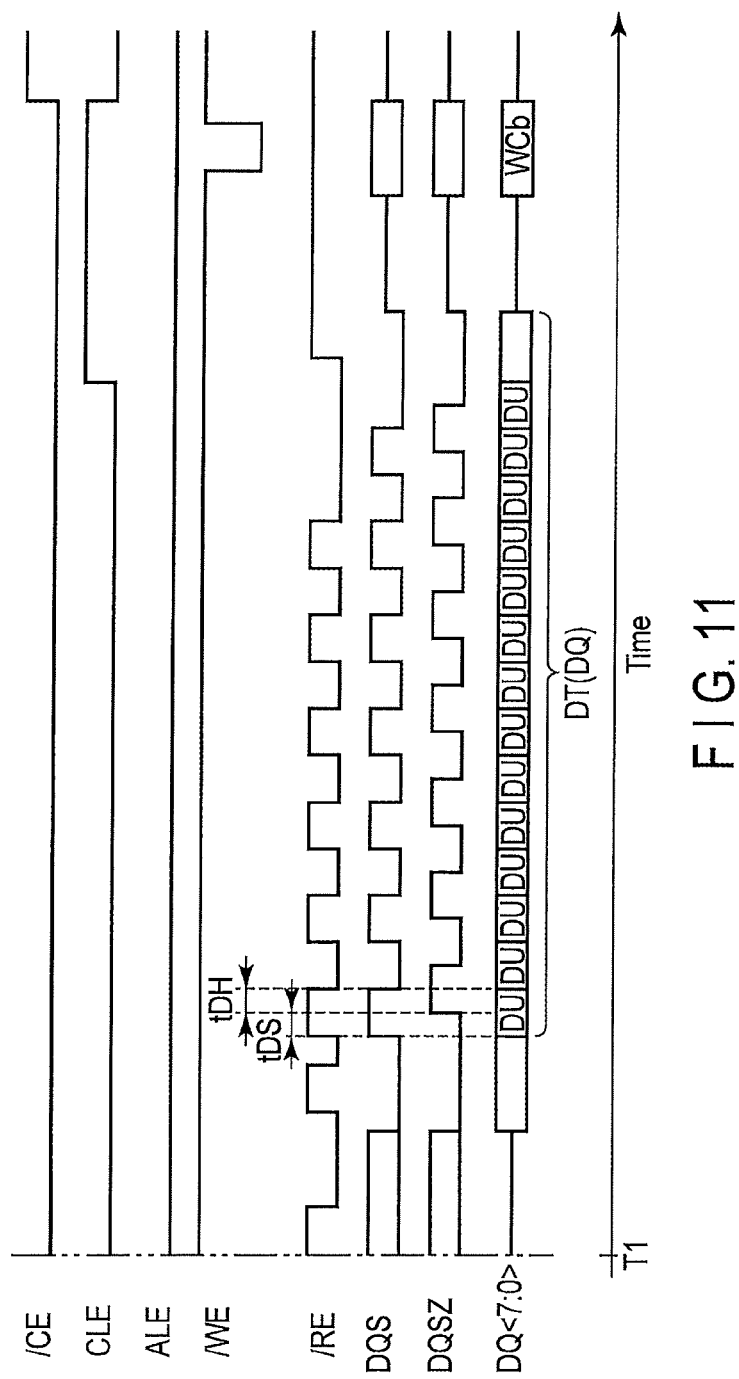
FIG. 11 is a diagram that explains an example of the operation of a memory device according to the third embodiment.

FIG. 11 is a timing chart showing the waveforms of each of control signals during a data transfer in the memory device 100 according to the present embodiment.

As illustrated in FIG. 11, after various signals are transmitted from the memory controller 200, the copy source first flash memory 10A generates, based on the read enable signal /RE from the memory controller 200, a data strobe signal DQS having the same clock frequency as that of the read enable signal /RE, in the same manner as the above-described examples.

The copy source flash memory 10A outputs a data signal DQ, whose edge is aligned with the data strobe signal DQS. The frequency of the data strobe signal DQS is the same as that of the switching frequency of the data signal DQ.

The flash memory 10A outputs both the data signal DQ and data strobe signal DQS onto the interconnects, with the edges of the data signal DQ and data strobe signal DQS being aligned.

Here, if the edge of the data strobe signal DQS and the edge of the data signal DQ are aligned with each other when viewed from the copy destination second flash memory 10B, the second flash memory 10B cannot ensure the sufficient data setup time tDS and data hold time tDH for retrieving the data signal DQ.

According to the present embodiment, when receiving the data signal DQ and the data strobe signal DQS, the second flash memory 10B delays either one of the data signal DQ or the data strobe signal DQS by the phase conversion circuit 70 in the second flash memory 10B. The phase conversion circuit 70 may shift the edges of the data signal DQ and the strobe signal DQS, for example, by 90 degrees.

As illustrated in FIG. 11, the phase of the data strobe signal DQSZ in the second flash memory 10B is shifted relative to the phase of the data signal DQ.

In this manner, the data signal DQ retrieved into the flash memory 10B can ensure a sufficient data setup time tDS and data hold time tDH for both the rising edge and falling edge of the data strobe signal DQSZ.

As discussed above, the memory device and its controlling method according to the third embodiment therefore can reduce the power consumption for the data transfer in a manner that the time for the DDR-based data transmission and reception can be ensured.

(5) Fourth Embodiment

A memory device and a memory device controlling method according to the fourth embodiment are explained with reference to FIGS. 12 and 13.

Figure 13:
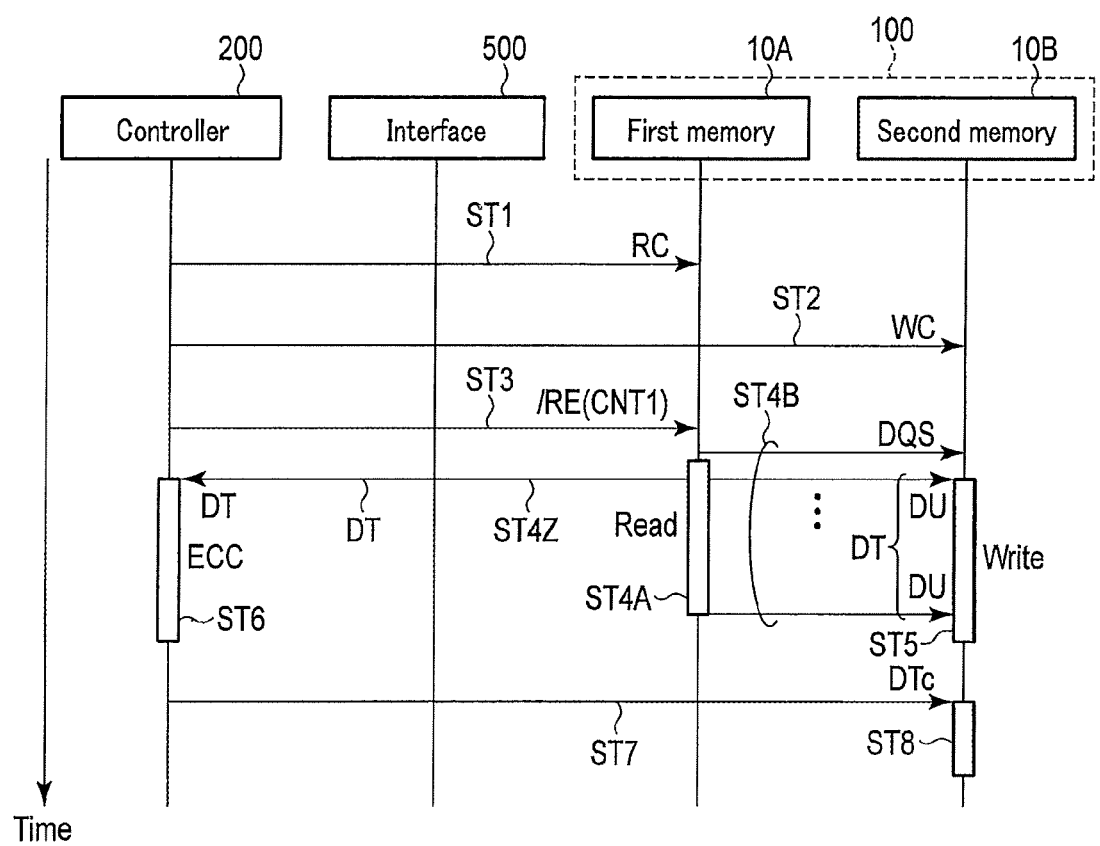
FIG. 13 is a diagram that explains an example of the operation of a memory device according to the fourth embodiment.

FIGS. 12 and 13 are diagrams that explain the memory device controlling method and the example operation according to the present embodiment.

A semiconductor memory has the possibility of the stored data changed to some other data due to degradation in characteristics of the memory cells such as a degradation in data retention. This may lead to an error included in the data read from the semiconductor memory.

As illustrated in FIG. 12, the memory controller 200 according to the fourth embodiment includes an ECC (error checking and correcting) circuit 20.

Errors in the copy data transferred between the memories 10A and 10B are corrected by the ECC circuit 20 of the memory controller 200, as described below.

As illustrated in FIGS. 12 and 13, when the copy source first flash memory 10A outputs data, the copy destination second flash memory 10B receives a data signal DQ, and at the same time, the memory controller 200 receives the same data signal DQ (Step ST4Z).

The memory controller 200 retrieves the data signal that is output from the copy source flash memory 10A to transfer to the copy destination flash memory 10B DQ, from the data line 90 (in the interface).

The memory controller 200 performs an ECC processing on the data signal DQ from the copy source flash memory 10A, by the ECC circuit 20 (Step ST6). The ECC circuit 20 checks whether any error is included in the data signal DQ. If an error is detected in the data signal, the ECC circuit 20 corrects the detected error.

After the data transfer from the first flash memory 10A to the second flash memory 10B is completed, the memory controller 200 transfers the data DTc that has been corrected (hereinafter referred to as the corrected data) to the copy destination second flash memory 10B (Step ST7). For instance, in order to write the corrected data DTc, the memory controller 200 outputs the write command WC and the address of the data to which the corrected data DTc is written, along with the corrected data DTc, to the second flash memory 10B via the memory interface 500.

The second flash memory rewrites the corrected data DTc in the memory region of the second flash memory 10B corresponding to the address at which the error-including data is stored (Step ST8). Alternatively, the corrected data DTc may be written in a memory region that is different from the address at which the error-including data is stored.

In this manner, the error in the data (copy data) transferred from the copy source flash memory 10A to the copy destination flash memory 10B can be corrected.

The overwriting process of the corrected data DTc may be performed so that the entire copy data including the corrected data is written into the copy destination flash memory 10B. Alternatively, the overwriting may be performed by partially writing the corrected data, which is part of the copy data, in the minimum control units for the writing.

As described above, according to the memory device and its controlling method of the fourth embodiment, the reliability of the data that is stored in the memory device can be improved while suppressing an increase in the power consumption for the data transfer.

(6) Fifth Embodiment

A memory device and a memory device controlling method according to the fifth embodiment will be explained with reference to FIG. 14.

When a data transfer is performed directly between the semiconductor memories, as described above, an operation that is different from the data transfer including the intermediation of a controller may be performed.

In a storage device which includes the memory device 100 and the memory controller 200 according to the fifth embodiment, a command is used to notify that the processing that is to be performed is a direct data transfer between the semiconductor memories.

According to the present embodiment, the flash memory 10 illustrated in FIG. 5 includes a register (command register) 80 in the state machine 8 to receive and retain a command CMDX that notifies a direct data transfer between memories (hereinafter referred to as a direct data transfer command).

Figure 14:
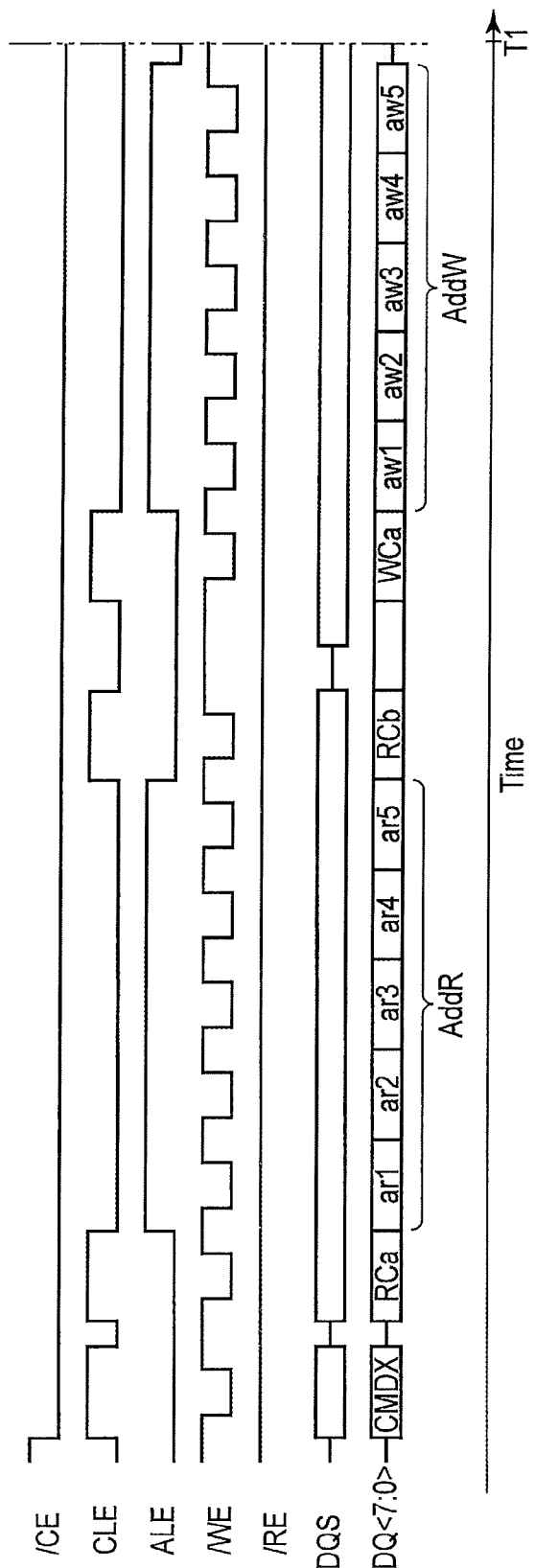
FIG. 14 is a diagram that explains an example of the operation of a memory device according to the fifth embodiment.

FIG. 14 is a timing chart for explaining the operation of the memory device and the memory controller 200 according to the fifth embodiment.

As illustrated in FIG. 14, the direct data transfer command CMDX is transmitted from the memory controller 200 to the memory device 100 before the transmission of the read command RC from the controller 200. Each of the flash memories 10 in the memory device 100 retrieves the direct data transfer command CMDX into the command register 80 of the state machine 8.

Based on this command CMDX, each of the flash memories 10 of the memory device 100 switches the circuit for controlling the data transfer and drives each of the circuits so as to enable the direct data transfer between the memories.

As described above, the storage device including the memory device 100 and the controller 200 according to the present embodiment includes a command CMDX that notifies of the performance of the direct data transfer between the memories.

As a result, the memory device and its controlling method according to the fifth embodiment are allowed to perform a direct data transfer between the memories, without significantly changing the structure of the memory interface.

(7) Sixth Embodiment

A memory device and a memory device controlling method according to the sixth embodiment are explained with reference to FIG. 15.

During a data transfer between memories, the flash memories cannot acknowledge which of the flash memories in the memory device will serve as a copy source memory until the chip address is supplied to the flash memory. For this reason, until the flash memories receive the chip address of the read address, each flash memory receives and analyzes the read command and address, and prepares for an operation based on the command.

In the same manner as the transmission and reception of the read command and address, each flash memory that can be a copy destination will not know which of the flash memories will serve as a copy destination flash memory until it receives the chip address. For this reason, a plurality of flash memories other than the copy source flash memory are driven until the chip address of the write address is received.

As discussed above, the signal indicating a selected chip is input to each flash memory (memory chip) 10 in the memory device 100 at a certain timing after the transmission of the command, for example, as the address (ar5, aw5) in the fifth cycle after the completion of the reception of the command.

If this is the case, during a period up to the identification of the copy source flash memory, and also during a period up to the identification of the copy destination flash memory, all the memory chips including non-selected flash memories receive commands and addresses.

Since non-selected chips that is not used for the data transfer perform an analyze processing to the commands and addresses, the power that does not contribute to the data transfer is consumed.

In the memory device 100 according to the sixth embodiment, in advance of the start of the data transfer, the memory controller 200 notifies the flash memories 10 as to which of the flash memories (memory chips) are the selected memories that will be used for the direct data transfer, by commands CMDS and CMDD. For instance, similar to the fifth embodiment, the flash memory of FIG. 5 includes a command register 80 in the state machine 8 to receive the commands CMDS and CMDD. The commands CMDS and CMDD include the chip address of the copy source and copy destination flash memories, respectively.

With such a structure, only the copy source and copy destination flash memories 10A and 10B that are targeted for the data transfer are selectively driven, while the operations of the flash memories (non-selected memories) other than the copy source and copy destination flash memories are suspended.

As a result, the memory device 100 according to the present embodiment can reduce the power consumption at the non-selected memories.

FIG. 15 is a timing chart for explaining the memory device controlling method according to the present embodiment.

As illustrated in FIG. 15, the memory controller 200 transmits a command CMDS indicating the chip address of the copy source flash memory 10A (hereinafter referred to as a copy source notification command) to the memory device 100 via the interface 500 before the transmission of the read command RC.

Each of the flash memories 10 in the memory device 100 retrieves the command CMDS into the command register 80 and analyzes it to determine whether or not the memory itself will be the copy source memory chip 10.

Based on the chip address in the copy source notification command CMDS, the flash memory 10A designated as a copy source is set to a selected state, and waits for a command RC and address AddR to be transmitted from the memory controller 200. Other flash memories 10 are turned into a suspended state (non-selected state).

After receiving the copy source notification command CMDS, the copy source flash memory 10A receives the read command RC and read address AddR from the memory controller 200. During the period of the copy source flash memory 10A receiving the read command and read address, the flash memories in the suspended state do not retrieve the read command RC and read address AddR unless they are driven.

The memory controller 200 transmits a command CMDD indicating the chip address of the copy destination flash memory 10B (hereinafter referred to as a copy destination notification command) to the memory device 100 via the memory interface 500 before the transmission of the write command WC. The flash memories 10 may return from the suspended state to the command receivable state based on the command latch enable signal CLE.

The plurality of flash memories 10 in the memory device 100 retrieve the copy destination notification command CMDD and analyze it to determine whether or not the memory itself will be a copy destination memory chip.

Based on the chip address of the copy destination notification command CMDD, the flash memory 10B designated as a copy destination is set to a selected state, and waits for the command WC and address AddW to be transmitted from the memory controller 200. The flash memories other than the copy destination flash memory 10A are set to a suspended state.

The copy destination flash memory 10B receives the write command WC and write address AddW from the memory controller 200. During the period of the copy destination flash memory 10B receiving the write command and write address, the flash memories in the suspended state do not retrieve the write command WC or write address AddW.

Thereafter, a direct data transfer between the two flash memories 10A and 10B is performed using the read enable signal /RE and strobe signal DQS, without the intermediation of the memory controller 200, in the same manner as the above-described embodiments.

Prior to the copy source and copy destination notification commands CMDS and CMDD, a direct data transfer command CMDX according to the fifth embodiment may be further transmitted via the interface 500, from the memory controller 200 to the memory device 100.

As discussed above, the non-selected chips other than the copy source and copy destination chips 10A and 10B are suspended at the same time as the reception of the commands CMDS and CMDD indicating the chip addresses, based on these commands CMDS and CMDD.

As a result, the memory device 100 according to the present embodiment can suppress the power consumption at non-selected chips and also suppress an increase in the power consumption of the memory device, during the data transfer.

Furthermore, the memory device 100 according to the present embodiment can realize the circuit for controlling the commands and addresses that are to suppress the power consumption at the non-selected chips by a relatively simple circuit.

As discussed above, the memory device and the memory device controlling method according to the present embodiment can reduce the power consumption of the memory device and the power consumption amount.

[Others]

The storage device 900 of FIG. 1 according to the above embodiments may further include memories other than the semiconductor memories 10A and 10B and a control device other than the controller 200 in accordance with the type and characteristics of the storage device. The memory device according to the above embodiments may be applied to storage devices such as an SD™ memory card, SSD, eMMC and USB memory. For instance, the storage device including a memory device according to the embodiments may be provided in a mobile device such as a cellular phone, tablet terminal, and digital camera.

The semiconductor memory used as a memory device according to the embodiments may be a NAND flash memory including a memory cell array having a three-dimensional structure.

According to the above embodiments, a NAND flash memory is indicated as a semiconductor memory (memory chip) in the memory device. The memory device according to the embodiments may also be a ReRAM, MRAM, PCRAM, DRAM, SRAM or the like.

According to the above embodiments, the two semiconductor memories that perform the direct data transfer are memories based on the same interface specifications. The direct data transfer between the memories using the memory device and its controlling method according to the present embodiments may be applicable to a memory device including a plurality of semiconductor memories having interface standards that are different from each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for controlling a memory device comprising a controller and first and second semiconductor memories, the method comprising:

upon consecutive receipt of a first read command, a read address, a second read command, a first write command, and a write address transmitted from the controller, reading, by the first semiconductor memory, data from the first semiconductor memory based on the read address, in response to every falling edge of a periodically-toggling first timing control signal provided from the controller, transmitting, from the first semiconductor memory, a data signal and a second timing control signal, the second timing control signal having a rising edge aligned with a start edge of the data signal and a falling edge aligned with a center of the data signal, in response to every falling edge of the periodically-toggling first timing control signal provided from the controller, receiving, by the second semiconductor memory, the data signal at a timing of the falling edge of the second tuning control signal transmitted from the first semiconductor memory without intermediation of the controller, upon receipt of a second write command transmitted from the controller after the data has been transferred from the first semiconductor memory to the second semiconductor memory, writing, by the second semiconductor memory, the data into the second semiconductor memory based on the write address.

2. The memory device controlling method according to claim 1, wherein transmitting the data signal from the first semiconductor memory and receiving the data signal at the second semiconductor memory are performed based on a SDR (Single Data Rate).

3. The memory device controlling method according to claim 1, further comprising:

receiving, by the controller including an ECC circuit, the data outputted from the first semiconductor memory;

when detecting an error in the received data, correcting the error using the ECC circuit; and transmitting, by the controller, data in which the error is corrected, from the controller to the second semiconductor memory.

4. The memory device controlling method according to claim 1, wherein the first and second semiconductor memories receive a first command for directly transferring the data from the first semiconductor memory to the second semiconductor memory from the controller before receiving the read command and the write command.

5. A memory device comprising:

a controller;

a first semiconductor memory controlled by the controller; and a second semiconductor memory controlled by the controller, wherein upon consecutive receipt of a first read command, a read address, a second read command, a first write command, and a write address transmitted from the controller, the first semiconductor memory reads data from the first semiconductor memory based on the read address, in response to every falling edge of a periodically-toggling first timing control signal provided from the controller, transmitting, from the first semiconductor memory, a data signal and a second timing control signal, the second timing control signal having a rising edge aligned with a start edge of the data signal and a falling edge aligned with a center of the data signal, in response to every falling edge of the periodically-toggling first timing control signal provided from the controller, receiving by the second semiconductor memory the data signal at a timing of the falling edge of the second timing control signal transmitted from the first semiconductor memory without intermediation of the controller, upon receipt of a second write command transmitted from the controller after the data has been transferred from the first semiconductor memory to the second semiconductor memory, writing, by the second semiconductor memory, the data into the second semiconductor memory based on the write address.

6. The memory device according to claim 5, wherein transmitting the data signal from the first semiconductor memory and receiving the data signal at the second semiconductor memory are performed based on a SDR (Single Data Rate).

7. The memory device according to claim 5, wherein the controller including an ECC circuit receives the data transmitted from the first semiconductor memory, when an error is detected in the received data at the controller, the ECC circuit corrects the error; and the second semiconductor memory receives a data in which the error is corrected from the controller.

8. The memory device according to claim 5, wherein the first and second semiconductor memories receive a first command for directly transferring the data from the first semiconductor memory to the second semiconductor memory from the controller before receiving the read command and the write command.

9. A memory device comprising:

a controller;

a first semiconductor memory including a first memory cell array, the first memory cell array including a plurality of first NAND strings, the first semiconductor memory being connected to the controller; and a second semiconductor memory including a second memory cell array, the first memory cell array including a plurality of second NAND strings, the second semiconductor memory being connected to the controller; and wherein upon consecutive receipt of a first read command, a read address, a second read command, a first write command, and a write address transmitted from the controller, the first semiconductor memory reads data from the first memory cell array based on the read address, in response to every falling edge of a periodically-toggling first timing control signal provided from the controller, transmitting, from the first semiconductor memory, a data signal and a second timing control signal, the second timing control signal having a rising edge aligned with a start edge of the data signal and a falling edge aligned with a center of the data signal, in response to every falling edge of the periodically-toggling first timing control signal provided from the controller, receiving, by the second semiconductor memory, the data signal at a timing of the falling edge of the second timing control signal transmitted from the first semiconductor memory without intermediation of the controller, upon receipt of a second write command transmitted from the controller after the data has been transferred from the first semiconductor memory to the second semiconductor memory, writing, by the second semiconductor memory, the data into the second semiconductor memory based on the write address.

* * * * *